United States Patent
Luk et al.

(10) Patent No.: US 11,368,615 B2
(45) Date of Patent: Jun. 21, 2022

(54) MODIFYING IMAGE PARAMETERS USING WEARABLE DEVICE INPUT

(71) Applicant: eBay Inc., San Jose, CA (US)

(72) Inventors: Bryant Genepang Luk, Round Rock, TX (US); Richard Chapman Bates, Austin, TX (US); Christopher Diebold O'Toole, Cedar Park, TX (US); Robert He, Pflugerville, TX (US); Jennifer T. Robertson, Cedar Park, TX (US); Yu Tang, Round Rock, TX (US); Jason Ziaja, Cedar Park, TX (US); Ananya Das, Austin, TX (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/997,884

(22) Filed: Aug. 19, 2020

(65) Prior Publication Data

US 2020/0404160 A1    Dec. 24, 2020

Related U.S. Application Data

(63) Continuation of application No. 16/256,451, filed on Jan. 24, 2019, now Pat. No. 10,785,403, which is a
(Continued)

(51) Int. Cl.
| | |
|---|---|
| *H04N 5/232* | (2006.01) |
| *G06F 3/00* | (2006.01) |
| *G06F 1/16* | (2006.01) |
| *H04N 5/235* | (2006.01) |
| *H04N 9/73* | (2006.01) |

(52) U.S. Cl.
CPC ......... *H04N 5/23216* (2013.01); *G06F 1/163* (2013.01); *G06F 3/005* (2013.01); *H04N 5/2353* (2013.01); *H04N 5/23206* (2013.01); *H04N 5/23212* (2013.01); *H04N 5/23245* (2013.01); *H04N 9/735* (2013.01)

(58) Field of Classification Search
CPC ........... H04N 5/23216; H04N 5/23212; H04N 5/23245; H04N 5/2353; H04N 5/23206; H04N 9/735; G06F 1/163; G06F 3/005
See application file for complete search history.

(56) References Cited

U.S. PATENT DOCUMENTS 9,055,276 B2 * 6/2015 Parulski ............... H04N 9/8211
9,473,687 B2   10/2016 Luk et al.
(Continued)

OTHER PUBLICATIONS

U.S. Appl. No. 16/256,451, filed Jan. 24, 2019, Issued.
(Continued)

*Primary Examiner* — Gevell V Selby
(74) *Attorney, Agent, or Firm* — Holland & Hart LLP

(57) ABSTRACT

Systems and methods are presented for modifying image parameters of an image to be captured by an image capturing device based on input from a wearable computing device. In some embodiments, the system receives image data, determines an image parameter based on the image data, and receives data from a wearable computing device positioned proximate to a subject of the image. The system modifies the image parameter based on the data received from the wearable computing device and captures the image data using the modified image parameter.

21 Claims, 7 Drawing Sheets

Related U.S. Application Data continuation of application No. 15/856,472, filed on Dec. 28, 2017, now Pat. No. 10,225,461, which is a continuation of application No. 15/272,983, filed on Sep. 22, 2016, now Pat. No. 9,888,170, which is a continuation of application No. 14/581,991, filed on Dec. 23, 2014, now Pat. No. 9,473,687.

(56) References Cited

U.S. PATENT DOCUMENTS

| | | | |
|---|---|---|---|
| 9,888,170 | B2 | 2/2018 | Luk et al. |
| 10,225,461 | B2 | 3/2019 | Luk et al. |
| 10,432,851 | B2 | 10/2019 | Tierney |
| 10,785,403 | B2 | 9/2020 | Luk et al. |
| 2003/0160862 | A1 | 8/2003 | Charlier et al. |
| 2006/0022814 | A1 | 2/2006 | Nogami et al. |
| 2006/0126894 | A1 | 6/2006 | Mori |
| 2006/0187319 | A1* | 8/2006 | Teramoto ............... H04N 5/772 348/231.99 |
| 2007/0053571 | A1 | 3/2007 | Hayashi |
| 2008/0278589 | A1 | 11/2008 | Thorn |
| 2010/0002084 | A1* | 1/2010 | Hattori ............... H04N 5/23212 348/207.1 |
| 2010/0128138 | A1 | 5/2010 | Nitta et al. |
| 2011/0058787 | A1* | 3/2011 | Hamada ........... H04N 21/44008 386/224 |
| 2011/0128401 | A1 | 6/2011 | Choi et al. |
| 2011/0164141 | A1 | 7/2011 | Tico et al. |
| 2011/0216218 | A1 | 9/2011 | Ogawa |
| 2011/0249144 | A1 | 10/2011 | Chang |
| 2013/0194421 | A1 | 8/2013 | Kita |
| 2013/0201359 | A1 | 8/2013 | Wu et al. |
| 2014/0139613 | A1 | 5/2014 | Anderson |
| 2014/0361986 | A1 | 12/2014 | Won et al. |
| 2015/0022698 | A1 | 1/2015 | Na et al. |
| 2015/0334292 | A1 | 11/2015 | Tartz et al. |
| 2015/0341561 | A1 | 11/2015 | Petrescu et al. |
| 2015/0350621 | A1 | 12/2015 | Sawa et al. |
| 2016/0182801 | A1 | 6/2016 | Luk et al. |
| 2017/0013189 | A1 | 1/2017 | Luk et al. |
| 2018/0124307 | A1 | 5/2018 | Luk et al. |
| 2019/0158728 | A1 | 5/2019 | Luk et al. |

OTHER PUBLICATIONS

U.S. Appl. No. 15/856,472, filed Dec. 28, 2017, Issued.
U.S. Appl. No. 15/272,983, filed Sep. 22, 2016, Issued.
U.S. Appl. No. 14/581,991, filed Dec. 23, 2014, Issued.
Applicant Initiated Interview Summary received for U.S. Appl. No. 14/581,991 dated Mar. 25, 2016, 3 pages.
Non-Final Office Action received for U.S. Appl. No. 14/581,991, dated Feb. 2, 2016, 10 pages.
Notice of Allowance received for U.S. Appl. No. 14/581,991, dated Jun. 22, 2016, 7 pages.
Response to Non-Final Office Action filed on May 2, 2016, for U.S. Appl. No. 14/581,991 dated Feb. 2, 2016, 8 pages.
Response to Non-Final Office Action filed on Jul. 23, 2018, for U.S. Appl. No. 15/856,472, dated Mar. 22, 2018, 9 pages.
Preliminary Amendment for U.S. Appl. No. 15/856,472, filed Mar. 5, 2018, 8 pages.
Notice of Allowance received for U.S. Appl. No. 15/272,983, dated Sep. 28, 2017, 9 pages.
Preliminary Amendment for U.S. Appl. No. 15/272,983, filed Nov. 9, 2016, 8 pages.
Response to First Action Interview—Office Action Summary filed on Aug. 8, 2017, for U.S. Appl. No. 15/272,983, dated Jul. 18, 2017, 11 pages.
Notice of Allowance received for U.S. Appl. No. 15/856,472, dated Oct. 17, 2018, 9 pages.
Applicant Initiated Interview Summary received for U.S. Appl. No. 15/856,472, dated Jun. 29, 2018, 2 pages.
Non-Final Office Action received for U.S. Appl. No. 15/856,472 dated Mar. 22, 2018, 6 pages.
First Action Interview—Pre-Interview Communication received for U.S. Appl. No. 15/272,983, dated May 4, 2017, 5 pages.
First Action Interview—Office Action Summary received for U.S. Appl. No. 15/272,983, dated Jul. 18, 2017, 12 pages.
Advisory Action received for U.S. Appl. No. 16/256,451, dated Nov. 12, 2019, 5 pages.
Final Office Action received for U.S. Appl. No. 16/256,451, dated Sep. 12, 2019, 11 pages.
Non Final Office Action received for U.S. Appl. No. 16/256,451, dated Jan. 7, 2020, 12 pages.
Non-Final Office Action received for U.S. Appl. No. 16/256,451, dated May 16, 2019, 11 pages.
Notice of Allowance received for U.S. Appl. No. 16/256,451, dated May 19, 2020, 7 pages.
Response to Final Office Action filed on Oct. 25, 2019, for U.S. Appl. No. 16/256,451, dated Sep. 12, 2019, 9 pages.
Response to Non-Final Office Action filed on Apr. 7, 2020, for U.S. Appl. No. 16/256,451, dated Jan. 7, 2020, 8 pages.
Response to Non-Final Office Action filed on Jul. 25, 2019, for U.S. Appl. No. 16/256,451, dated May 16, 2019, 8 pages.
Response to Pre-Interview First Office Action filed on Jun. 5, 2017, for U.S. Appl. No. 15/272,983, dated May 4, 2017, 3 pages.

* cited by examiner

MODIFYING IMAGE PARAMETERS USING WEARABLE DEVICE INPUT

PRIORITY

This application is a continuation application of U.S. patent application Ser. No. 16/256,451, filed on Jan. 24, 2019, entitled "MODIFYING IMAGE PARAMETERS USING WEARABLE DEVICE INPUT," which is a continuation application of U.S. patent application Ser. No. 15/856,472, filed on Dec. 28, 2017, entitled "MODIFYING IMAGE PARAMETERS USING WEARABLE DEVICE INPUT," which is a continuation application of U.S. patent application Ser. No. 15/272,983, filed on Sep. 22, 2016, entitled "MODIFYING IMAGE PARAMETERS USING WEARABLE DEVICE INPUT," which is a continuation application of U.S. patent application Ser. No. 14/581,991, filed on Dec. 23, 2014, entitled "MODIFYING IMAGE PARAMETERS USING WEARABLE DEVICE INPUT." The entire contents of these applications are incorporated herein by reference in their entirety.

TECHNICAL FIELD

The subject matter disclosed herein generally relates to photography. Specifically, the present disclosure addresses systems and methods for modifying image parameters in a camera device using data received from a wearable computing device.

BACKGROUND

Cameras, and devices containing cameras, such as smartphones, are used to capture images of individuals and groups. Groups take candid and posed photographs, some of which employ a time delay function of the camera or device or a remote control device connected to the camera to trigger the capture of an image. Wearable computing devices, such as smart watches and glasses, having one or more sensors have recently become popular. Wearable computing devices can be used to chart activities, such as exercise and rest, using the one or more sensors embedded within the wearable computing device. Although some cameras can employ remote controls, controllers for cameras are often limited to enabling a user to remotely trigger a shutter of the camera or manually adjust camera settings.

BRIEF DESCRIPTION OF THE DRAWINGS

Some embodiments are illustrated by way of example and not limitation in the figures of the accompanying drawings.

DETAILED DESCRIPTION

Example methods and systems are directed to modifying image parameters of an image to be captured by an image capturing device based on input from a wearable computing device. For example, users with wearable computing devices about to get their picture taken can be in communication with the image capturing device through the wearable computing device. The image capturing device can adjust automatically to get the best picture by modifying settings such as zoom, lighting, picture mode, resolution, and other image and camera parameters. The image capturing device can also automatically focus on subjects within the image to be captured based on proximity of the wearable computing device to the user or subject of the image. Further, example methods and systems are directed to modifying parameters, functions, and modes of an image capture device based on input from a wearable computing device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
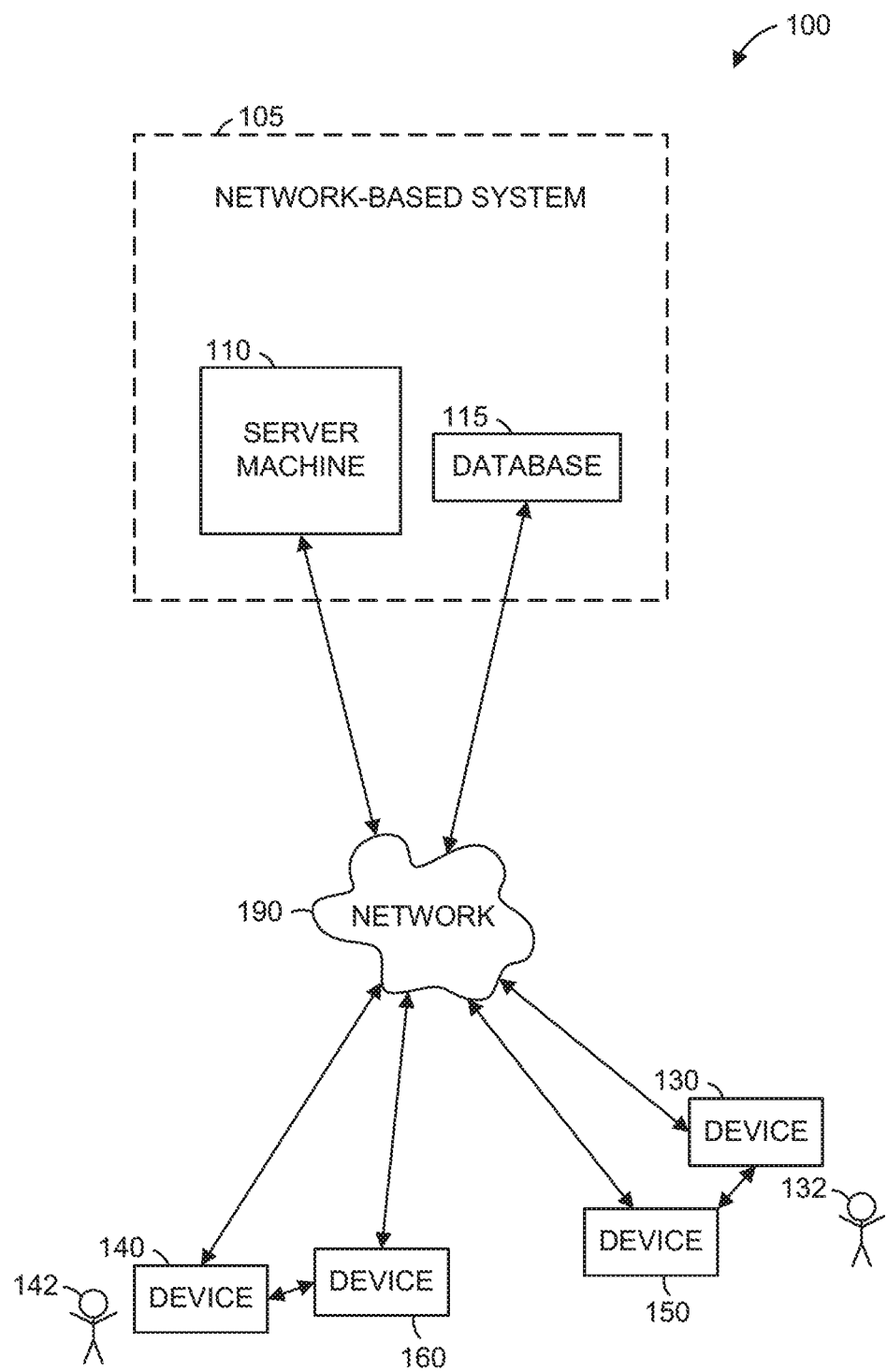
FIG. 1 is a network diagram illustrating a network environment suitable for modifying image parameters of an image to be captured by an image capturing device based on input from a wearable computing device, according to some example embodiments.

FIG. 1 is a network diagram illustrating a network environment 100 suitable for modifying image parameters of an image to be captured by an image capturing device based on input from a wearable computing device, according to some example embodiments. The network environment 100 includes a server machine 110, a database 115, user devices 130 and 140, and wearable computing devices 150 and 160, all communicatively coupled to each other via a network 190. The server machine 110 may form all or part of a network-based system 105 (e.g., a cloud-based server system configured to provide one or more services to the user devices 130 and 140). The server machine 110 and the user devices 130 and 140 may each be implemented in a computer system, in whole or in part, as described below with respect to FIG. 2 or 7.

In some embodiments, the server machine 110 can be a server, web server, database, or other machine capable of receiving and processing information, such as image data.

The server machine 110 can be a portion of a social media system, website, or database. In some embodiments, the server machine 110 can include software and hardware capable of performing facial recognition analysis of image data. Further, in some embodiments, the server machine 110 can include non-transitory machine readable media containing information indicative of a user and subjects associated with the user. For example, the data indicative of the subjects can include facial profiles for the subjects and the user, one or more characteristics used for facial recognition analysis, identification data, and other suitable identifying data. In some embodiments, at least a portion of the identification data can be wearable device identification data associated with the subjects and the user.

Also shown in FIG. 1 are users 132 and 142. One or both of the users 132 and 142 may be a human user (e.g., a human being), a machine user (e.g., a computer configured by a software program to interact with the user device 130), or any suitable combination thereof (e.g., a human assisted by a machine or a machine supervised by a human). The user 132 is not part of the network environment 100, but is associated with the user device 130 and may be a user of the user device 130. For example, the user device 130 may be a desktop computer, a vehicle computer, a tablet computer, a navigational device, a portable media device, a smartphone, or a wearable device (e.g., a smart watch or smart glasses) belonging to the user 132. Likewise, the user 142 is not part of the network environment 100, but is associated with the user device 140. As an example, the user device 140 may be a tablet computer, a portable media device, a smartphone, a wearable device (e.g., a smart watch or smart glasses), or other suitable devices belonging to the user 142.

The wearable computing devices 150 and 160 can be mobile devices configured to be worn by the user 132 or 142. For example, wearable computing devices can be configured as a watch, glasses, a ring, or any other suitable wearable article. The wearable computing devices 150 and 160 can include one or more processor, one or more memory, one or more display device, one or more input/output device, one or more communication device, and one or more sensor. The one or more processor, one or more memory, one or more display device, one or more input/output device, and one or more communication device can be implemented similarly to the components described in relation to FIGS. 2 and 7 below. The one or more sensor of the wearable computing device 150 or 160 can be chosen from a group consisting of a light sensor, a position sensor (e.g., GPS, altimeter, or elevation sensor), a clock, an accelerometer, a gyroscope, a microphone (e.g., where the user device 130 is configured to capture the image data as a set of images comprising a video), or other sensors or input devices of the wearable computing device 150 and 160.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices such as the server machine 110, the user device 130, and a wearable device. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. The network 190 may be formed in whole or in part as an ad hoc network at the time of or proximate to the time of communication between the user device 130 and the wearable device. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
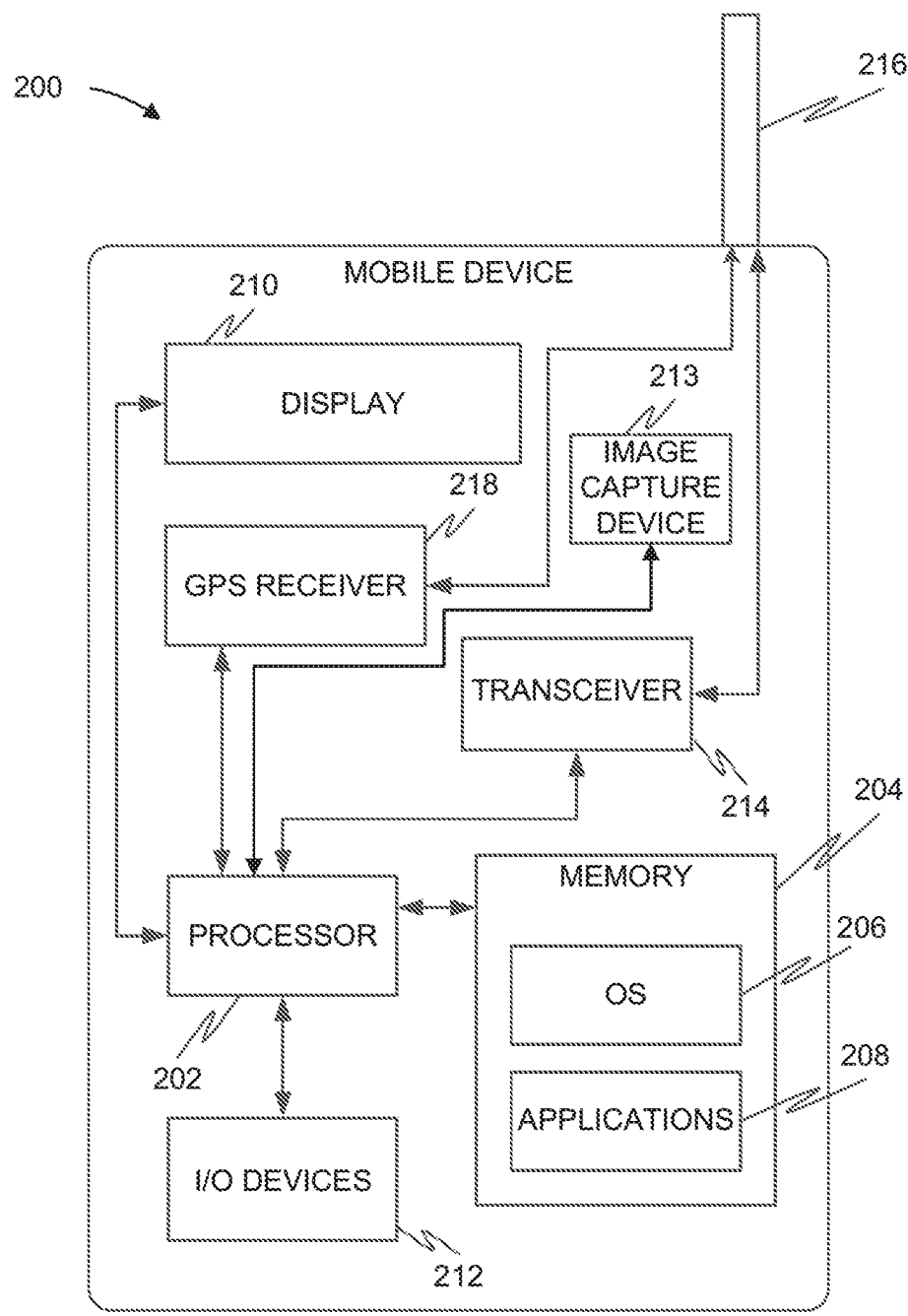
FIG. 2 is a block diagram illustrating components of a device capable of capturing image data, according to some example embodiments.

FIG. 2 is a block diagram illustrating a mobile device 200 capable of capturing image data, according to some example embodiments. For example, the mobile device 200 may be an implementation of the user device 130. The mobile device 200 is configured to perform any one or more of the methodologies discussed herein with respect to the user device 130. For example, the mobile device 200 can receive image data, determine image parameters, communicate with the wearable device to receive data (e.g., sensor data) from the wearable device prior to capturing an image, and modify image parameters based on data received from the wearable device. Further, the mobile device 200 can include for an image capture system discussed below with regard to FIG. 3.

The mobile device 200 can include a processor 202. In some embodiments, the processor 202 may be implemented as one or more processor 202. The processor 202 can be any of a variety of different types of commercially available processors suitable for mobile devices 200 (for example, an XScale architecture microprocessor, a Microprocessor without Interlocked Pipeline Stages (MIPS) architecture processor, or another type of processor). A memory 204, such as a random access memory (RAM), a Flash memory, or other type of memory, is typically accessible to the processor 202. The memory 204 can be adapted to store an operating system (OS) 206, as well as application programs 208, such as a mobile location enabled application that can provide location-based services to a user. The processor 202 can be coupled, either directly or via appropriate intermediary hardware, to a display 210 and to one or more input/output (I/O) devices 212, such as a keypad, a touch panel sensor, a microphone, an image capture device 213, and the like. The image capture device 213 can form a portion of an image capture system 300, described with respect to FIG. 3. The image capture system 300 can receive image data, from the image capture device 213; receive data from the wearable device; and modify image parameters based on the data received from the wearable device.

In some example embodiments, the processor 202 can be coupled to a transceiver 214 that interfaces with an antenna 216. The transceiver 214 can be configured to both transmit and receive cellular network signals, wireless data signals, or other types of signals via the antenna 216, depending on the nature of the mobile device 200. Further, in some configurations, a GPS receiver 218 can also make use of the antenna 216 to receive GPS signals.

It should be noted that, in some embodiments, the mobile device 200 can include additional components or operate with fewer components than described above. Further, in some embodiments, the mobile device 200 may be implemented as a camera with some or all of the components described above with respect to FIG. 2. For example, the mobile device 200 can be a point and shoot digital camera, a digital single-lens reflex camera (DSLR), a film single-lens reflex camera (SLR), or any other suitable camera capable of performing at least a portion of the methodologies described in the present disclosure.

The mobile device 200 can be configured to perform any one or more of the methodologies discussed herein. For example, the memory 204 of the mobile device 200 may include instructions comprising one or more modules for performing the methodologies discussed herein. The modules can configure the processor 202 of the mobile device 200, or at least one processor where the mobile device 200 has a plurality of processors, to perform one or more of the operations outlined below with respect to each module. In some embodiments, the mobile device 200 and the server machine 110 can each store at least a portion of the modules discussed above and cooperate to perform the methods of the present disclosure, as will be explained in more detail below.

Figure 3:
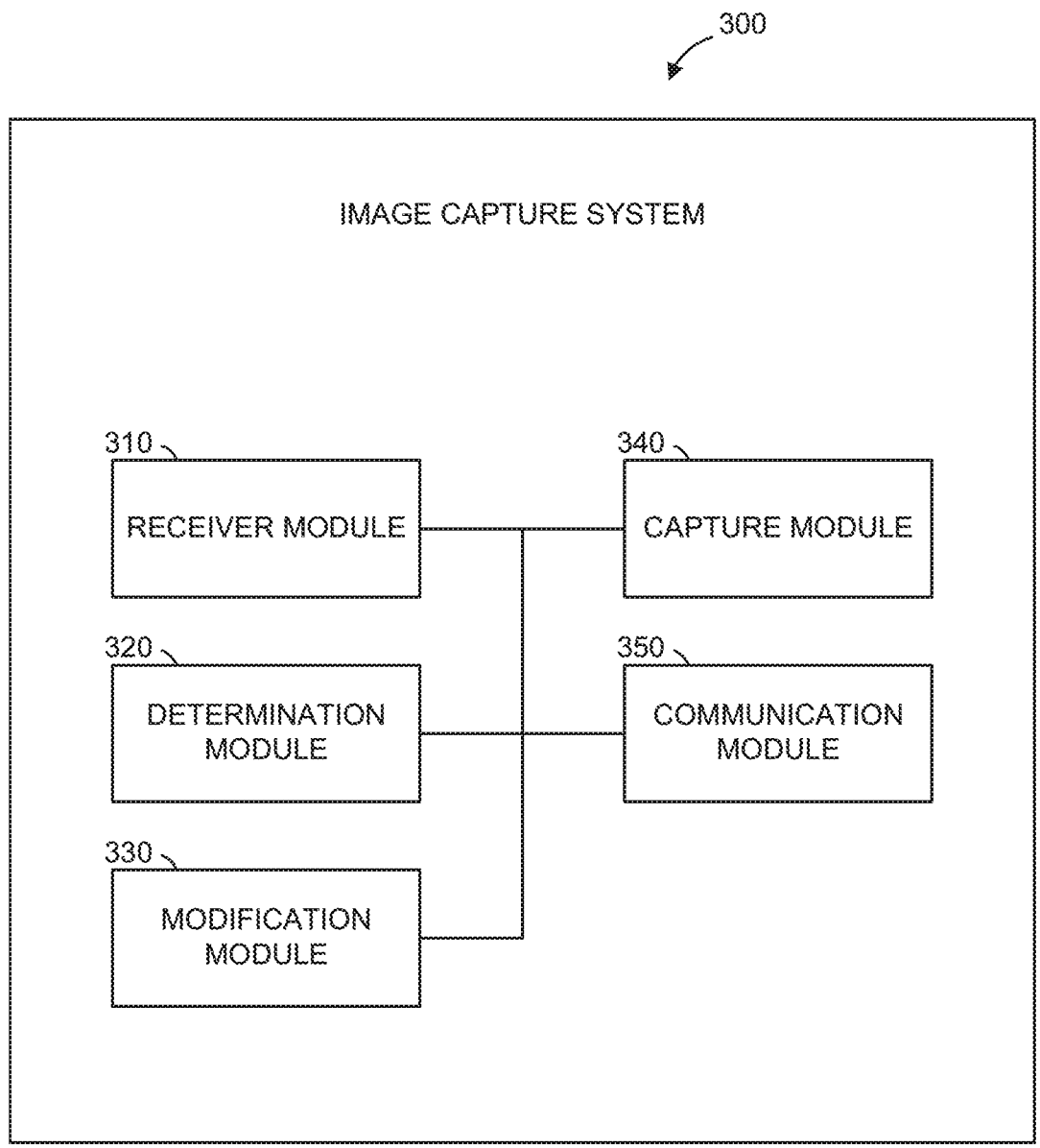
FIG. 3 is a block diagram illustrating components of an image capture system capable of capturing image data with an image parameter.

FIG. 3 is a block diagram illustrating modules of an image capture system 300 capable of capturing image data with an image parameter, according to some example embodiments. The image capture system 300, as discussed above can be included in the mobile device 200 and incorporate the image capture device 213. In some embodiments, in addition to the image capture device 213, the image capture system 300 can include, temporarily or permanently, a processor (e.g., an image processor in communication with the image capture device 213), a memory (e.g., the memory 204), and communications components (e.g., transceiver 214, antenna 216, and GPS receiver 218) in the form of one or more modules performing the methodologies described below.

The image capture system 300 includes a receiver module 310, a determination module 320, a modification module 330, a capture module 340, and a communication module 350, all configured to communicate with each other (e.g., via a bus, shared memory, or a switch). Although described as part of the mobile device 200, the image capture system 300 can be distributed across multiple devices, such that certain of the modules associated with the image capture system 300 can reside in the mobile device 200 and certain other modules can reside the wearable computing device 150 or 160. The modules, whether on a single device or distributed across multiple systems or devices, can cooperate to perform any one or more of the methodologies described herein.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, as described above and according to various example embodiments, modules described herein as being implemented within a single machine, database, or device may be distributed across multiple machines, databases, or devices. For example, as referenced above with respect to FIG. 1, in some embodiments, the server machine 110 can cooperate with the user device 130 via the network 190 to perform the methods described below. In some embodiments, one or more of the modules or portions of the modules, discussed above, can be stored on the server machine 110 as well as on the mobile device 200.

The receiver module 310 receives image data of a photo to be taken and data from the wearable computing device 150 or 160. The image data can comprise a subject. The receiver module 310 can also receive data from the wearable computing device 150 or 160 positioned proximate to the subject. The receiver module 310 can receive the image data from the image capture device 213 of the user device 130. For example, the image capture device 213 can comprise hardware components including an image sensor (e.g., charge-coupled device (CCD) or complementary metal-oxide-semiconductor (CMOS)). The image sensor can detect the image data of the photograph to be taken, and the image capture device 213 can pass the image data to the receiver module 310. In some embodiments, the receiver module 310 can comprise a portion of the image capture device 213, or the image capture device 213 can comprise a portion of the receiver module 310. Further, in some instances, the receiver module 310 can communicate with the image capture device 213 and the determination module 320 via the communication module 350. The receiver module 310 can be a hardware-implemented module. An example embodiment of components of the receiver module 310 is described with respect to the module described below and referenced by FIG. 7.

The data from the wearable computing device 150 or 160 received by the receiver module 310 can comprise one or more of sensor data, data indicative of user input, or other data capable of being generated or transmitted by the wearable computing device 150 or 160. For example, where the data is sensor data, the data can be generated by a sensor such as a light sensor, a position sensor (e.g., GPS, altimeter, or elevation sensor), a clock, an accelerometer, a gyroscope, a microphone, or other sensors of the wearable computing device 150 or 160. In some embodiments, the receiver module 310 can receive sensor data related to an image to be captured while sensor data of the wearable computing device 150 or 160 unrelated to image data is not transmitted to the receiver module 310. Where the data is user input data, the data can be representative of one or more user interaction with user interface elements of a user interface on the wearable computing device 150 or 160.

The image to be captured can be image data already captured by the image capture device 213, where the methods described herein are relating to determining whether to modify the image data or to recapture the image data based on data received from the wearable computing device 150 or 160. In some embodiments, the image capture device 213 can receive image data and pass the image data to the display 210 without storing the image data into the memory 204 of the mobile device 200.

The determination module 320 determines an image parameter based on the image data. In some example embodiments, the determination module 320 determines an image capture mode based on the image data. The image capture mode can comprise a portion or all of the image parameters for the image data. The determination module 320 can receive the image data from the receiver module 310. For instance, the receiver module 310 can pass the image data to the determination module 320 via the communication module 350. The image capture mode can include a plurality of predetermined settings or values for camera parameters which can be applied to image data by the image capture device 213 at the time of capturing the image data. The determination module 320 can be a hardware implemented module as described in more detail below with and referenced by FIG. 7.

The determination module 320 can determine the image parameter based on the image data received from the receiver module 310. For example, the image capture device 213 can initially include one or more default settings for image parameters, such as a default image size, a zoom value, white balance, color balance, focus value, frame orientation, or other image parameters discussed in more detail below. One or more of the default settings for image parameters can be included in the image data received by the determination module 320. In some example embodiments, the determination module 320 can determine the image parameter based on a comparison between the image data and a set of predetermined default image parameters. In this example, the determination module 320 can determine the one or more image parameter where the value of an image parameter differs from that of the predetermined default image parameters. In some instances, the determination module 320 can determine the image parameter based on an analysis of the image data or metadata associated with the image data by identifying one or more image parameters, described in more detail below, and values associated with the one or more image parameters. Although a few examples of methods for determining image parameters have been described, it will be understood by one skilled in the art that the image parameters may be determined from the image data in any suitable manner.

The determination module 320 can determine the image capture mode similarly to the image parameter, by evaluation of the image data, evaluation of the metadata associated with the image data, a comparison to a predetermined image capture mode, or other methods. The image capture mode can be a first image capture mode of a plurality of image capture modes. In some instances, the determination module 320 can select or identify the image capture mode when the image capture mode has not already been specified by the image capture device 213 or the user 132.

The modification module 330 modifies the image parameter based on the data received from the wearable computing device 150 or 160. For example, the data received from the wearable computing device 150 or 160 can include data from sensors related to one or more image parameter, such as a light sensor (e.g., exposure related image parameters), an accelerometer (e.g., ISO speed and shutter speed image parameters), a position sensor (e.g., giving relative position of the wearable device to the image capture system 300). In some instances, the data received from the wearable computing device 150 or 160 which can be correlated with other data to modify one or more image parameter. In embodiments where the determination module 320 determines the image capture mode for the image capture device 213 capturing the image data, the modification module 330 can receive data relating to one or more image parameters having values affected by the image capture mode. The modification module 330 can be a hardware implemented module as described in more detail below and referenced by FIG. 7.

The modification module 330 can modify the image parameter by changing one or more values corresponding to the image parameter within the image data or within metadata associated with the image data. For example, where the modification module 330 receives data indicative of a light reading from a light sensor, the modification module 330 can modify an image parameter by changing one or more values corresponding to a white balance, a shutter speed, an aperture size, or other image parameters affected by a light proximate to the subject of an image to be captured. The values corresponding to the image parameter can be stored in a data structure associated with the image data or comprising all or a portion of the image data. In some embodiments, where the image parameter is a camera parameter (e.g., lens parameters, aperture size, field of view, yaw, pitch, roll, a flash setting, and zoom parameters), the modification module 330 can, at least temporarily, modify the camera parameter by changing one or more value corresponding to the camera parameter in a data structure associated with the image capture device 213.

The modification module 330 can modify the image capture mode, similarly to the image parameter, by changing one or more values corresponding to the image capture mode within the image data, within metadata associated with the image data, or within data associated with the image capture device 213. The modification module 330 can modify the image capture mode such that images captured by the image capture device 213 are processed using the modified image capture mode, for example. In some instances, the modification module 330 can modify the image capture device 213, selecting a second or different image capture mode, regardless or in spite of the first image capture mode being selected by the image capture device 213 or the user 132. In some example embodiments, the modification module 330 can modify the image capture device 213 based on a determination by the determination module 320 that the first image capture mode will produce an image unsuitable to one or more of the image parameter or the subject of the photograph to be taken. In some embodiments, the modification module 330 can modify image parameters (e.g., metadata relating to the image capture device 213 or the image data) and then cause a recapturing of the image. In some embodiments, the modification module 330 can reprocess image data already captured by the image capture device 213 to conform to the modified image parameters or the image capture mode.

The capture module 340 captures the image data using the modified image parameter. In embodiments where the modification module 330 has modified the image capture mode, the capture module 340 captures the image data using the modified image capture mode. The capture module 340 can be a hardware-implemented module as described in more detail below with respect to the module of FIG. 7. In some instances the capture module 340 can comprise all or a portion of the image capture device 213 and computer-executable instructions associated with the image capture device 213. In some example embodiments, the image capture device 213 can include all or a portion of the capture module 340. The capture module 340 is in communication with the communication module 350. For example, the modified image parameter, the modified image capture mode, or data indicative of the modified image parameter or the modified image capture mode can be transmitted from the determination module 320 or the modification module 330 to the capture module 340 by the communication module 350.

In some embodiments, the capture module 340 can capture image data representative of the image to be captured (e.g., using an image sensor of the image capture device 213), process the image data using the modified image parameter or the modified image capture mode, and store the processed image data on non-transitory machine-readable storage medium associated with one or more of the user device 130 and the wearable computing device 150 or 160. For example, the image capture device 213 can capture image data for the image to be captured (e.g., capture the image data and store the image data in the memory 204 of the mobile device 200). The image data can be in a raw state (e.g., raw image format) where the data has been minimally processed by the image sensor or other components of the image capture system 300 or the mobile device 200. The capture module 340 can process the image by adjusting one or more of the exposure, contrast, color and detail, a filter, a gradient, or other aspects of the image data based on the modified image parameter. The capture module 340 can store the processed image data on the non-transitory machine-readable storage medium via the communication module 350.

The communication module 350 enables communication between the image capture system 300 and the wearable computing device 150 or 160. In some example embodiments, the communication module 350 can enable communication among the receiver module 310, the determination module 320, the modification module 330, and the capture module 340. The communication module 350 can be a hardware-implemented module as described in more detail below and referenced by FIG. 7. For example, the communication module 350 can include communications mechanisms such as an antenna, a transmitter, one or more bus, and other suitable communications mechanisms capable of enabling communication between the modules, the user device 130, and the wearable computing device 150 or 160.

Figure 4:
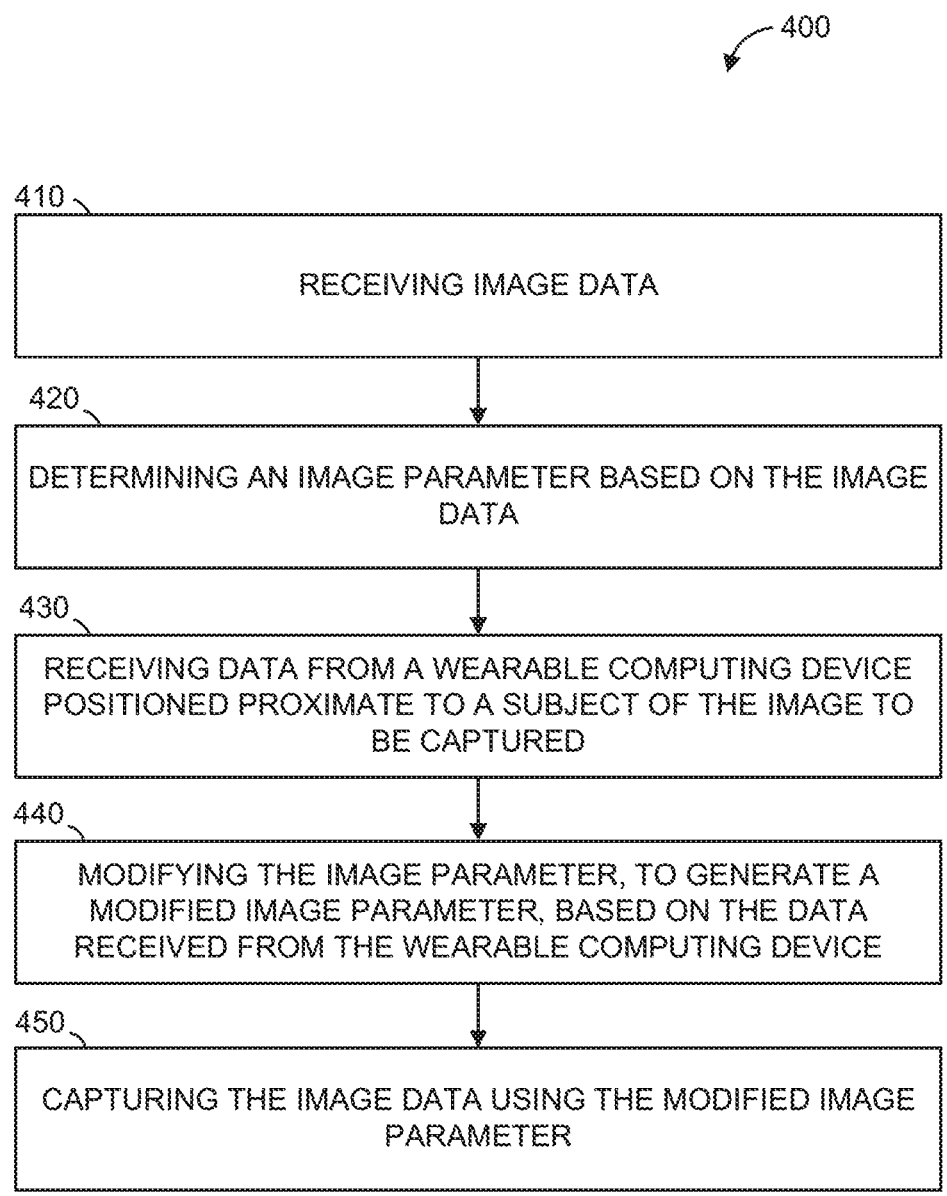
FIG. 4 is a flowchart illustrating operations of an image capture system in performing a method of determining an image parameter of an image to be captured and modifying the image parameter based on data received from a wearable computing device, according to some example embodiments.

FIG. 4 is a flow chart illustrating operations of the image capture system 300 in performing a method 400 of determining an image parameter of an image to be captured and modifying the image parameter based on data received from a wearable computing device 150 or 160. Operations in the method 400 may be performed by the image capture system 300, in cooperation with one or more of the user device 130, the image capture device 213, and a wearable computing device 150 or 160, using modules described above with respect to FIG. 2.

In operation 410, the receiver module 310 receives image data of an image to be captured. The image capture system 300, via the receiver module 310, can receive the image data prior to capturing the image as a photograph. The image data can comprise at least one subject. In some instances, the receiver module 310 receives the image data from the image capture device 213 of the user device 130. For example, the image capture device 213 can detect image data using an image sensor, or other suitable image sensor. Prior to capturing the image, the image sensor can transmit the image data to the image capture device 213, which may then transmit the image data to the receiver module 310. The image data can be transmitted between the image capture device 213 and the receiver module 310 via the communication module 350, via a direct physical or logical connection between the image capture device 213 and the receiver module 310, or by a portion of the image capture device 213 and the receiver module 310 being shared between the image capture device 213 and the receiver module 310.

Although described in reference to a still image, the image data can be representative of a set of image data and audio data to be captured (e.g., a video recording). In these instances, the receiver module 310 can receive first image data representative of the set of image data and audio data to be received. During capture of the set of image data and audio data, the method 400 can be performed multiple times during the video recording to determine whether image parameters, image capture modes, or camera parameters should be modified based on changes in the set of image data and audio data received by the receiver module 310. For example, the method 400 can be performed multiple times and modify aspects of the set of image data and audio data based on changes in light, movement, or sound associated with the subjects being captured in the video recording.

In operation 420, the determination module 320 determines an image parameter based on the image data. For example, the image parameter can be one or more of an exposure time, an International Organization for Standardization (ISO) film speed, an exposure value, an exposure offset, a focus value (e.g., focus distance, continuous focus, automatic focus, manual focus, macro, infinity, and fixed), and other suitable image parameters. The image parameter is not limited to parameters related to the image data but can also correspond to a camera parameter such as a set of lens parameters (e.g., focal length, maximum aperture, wide angle lens, long-focus lens, normal lens, telephoto lens, a number of lens elements and degree of asphericity, lens filters), aperture size, field of view, yaw, pitch, roll, a flash setting, a color balance, a white balance, contrast ratio, dynamic range (e.g., f-stops), flare, blend priority, view point offset, shift parameters, shear parameters, image sensor parameters (e.g., image sensor size, image sensor ratio, and image sensor pixel count) and image effects (e.g., sepia tones, black and white, negative, solarize, and red-eye reduction).

The camera parameter can be a parameter associated with the image capture device 213, an image sensor (e.g., CCD or CMOS) of the image capture device 213, a lens of the user device 130, or other parameter associated with the user device 130 or with components associated with the image capture system 300. Although, in some embodiments, the camera parameter cannot be directly changed, an effect of the camera parameter can be modified by a module described herein; software associated with the image capture device 213; hardware or software of the user device 130; a combination of hardware and software; or a combination of a module, hardware, and software. For example, the camera parameters corresponding to zoom capabilities of a lens of the image capture device 213 can be modified by digital zoom capabilities associated with modules, hardware, or software associated with the image capture device 213.

The determination module 320 can determine the image parameter by receiving the image parameter as part of the image data. For example, the determination module 320 can receive the image parameter as a default setting for image parameters. In some instances the image parameter can be determined based on a comparison between the image data and a set of predetermined default image parameters. In comparing the image data and the predetermined default image parameters, the determination module 320 can determine the image parameter where the value of the image parameter differs from the default. The determination module 320 can also determine the image parameter using metadata associated with the image data, received by the receiver module 310 along with the image data and then transmitted to the determination module 320.

In some example embodiments, the determination module 320 can determine the image parameter based on a combination of image parameters received by the receiver module 310 and known to the determination module 320. For example, where three or more image parameters are associated and two of the three or more image parameters are known, the determination module 320 can calculate the remaining one or more image parameters based on one or more appropriate formula.

Where the image parameter is a focus value, for example, the focus value can be indicative of the focus on the subject, or another point within the image data. The focus value can be a value associated with the subject indicative of a point where light rays originating from the subject converge. In some instances, the focus value can be a value indicative of a principle focus or focal point at which the subject can be reproduced in the image data above a predetermined level of clarity or sharpness.

In operation 430, the receiver module 310 receives data from a wearable computing device 150 or 160 positioned proximate to the subject. Receiving the data from the wearable computing device 150 or 160 can comprise receiving sensor data generated by one or more sensor of the wearable computing device 150 or 160 and transmitted to the receiver module 310 by a combination of the wearable computing device 150 or 160 and the communication module 350. The one or more sensor can be chosen from a group consisting of a light sensor, a position sensor (e.g., GPS, altimeter, or elevation sensor), a clock, an accelerometer, a gyroscope, a microphone (e.g., where the user device 130 is configured to capture the image data as a set of images comprising a video), or other sensors or input devices of the wearable computing device 150 or 160.

In some example embodiments, a first portion of the data received from the wearable computing device 150 or 160 can be sensor data and a second portion of the data received from the wearable computing device 150 or 160 can be control data indicative of user input into the wearable computing device 150 or 160. The control data can include manual selections of user interface options or preferences including image parameters and image capture modes. The control data can also include selections among image capture and video recording.

In some instances, the data received from the wearable computing device 150 or 160 can comprise determining a proximity of the wearable computing device 150 or 160 to the image capture device 213. In these instances, the method 400 can include operations in which the user device 130 and the wearable computing device 150 or 160 can communicate to determine a distance extending between the wearable computing device 150 or 160 and the image capture device 213. Determining the proximity of the wearable computing device 150 or 160 can be performed by comparison of GPS signals associated with the wearable computing device 150 or 160 and the image capture device 213, determination based on communication technologies (e.g., Bluetooth® range estimation), triangulation, or any other suitable distance determination or estimation.

Although operation 430 is discussed with respect to receiving data from a single wearable computing device 150 or 160, the receiver module 310 can receive data from a plurality of wearable computing devices. For example, where the image to be captured includes a plurality of subjects, some of whom are in proximity to a wearable computing device 150 or 160 capable of or configured to communicate with the receiver module 310, the receiver module 310 can receive data from each of the wearable computing devices 150 and 160 proximate to the plurality of subjects.

In operation 440, the modification module 330 modifies the image parameter. The modification of the image parameter can generate a modified image parameter based on the data received from the wearable computing device 150 or 160. For example, the image data can comprise a first subject and a second subject with the wearable device positioned proximate to the first subject. Where a plurality of wearable computing devices are present, the modification module 330 can modify the image parameter based on the data received from the plurality of wearable computing devices. For instance, the modification module 330 can prioritize data from a single representative wearable computing device 150 or 160, where the data received from the plurality of wearable computing devices is with within a predetermined threshold. By way of another example, the modification module 330 can modify the image parameter based on the data from each of the plurality of wearable computing devices or based on representative data (e.g., an average value or a mean value) from the plurality of wearable computing devices. In some embodiments, the modification module 330 can modify a plurality of image parameters, where certain or all of the plurality of image parameters are modified based on data from certain or all of the plurality of wearable computing devices.

The image parameter can be modified to prioritize the first subject proximate to the wearable computing device 150 or 160 based on the data received from the wearable computing device 150 or 160. For instance the image parameter can be a focus value and modified to focus on the first subject instead of an original setting focusing on both the first and second subjects. Modifying the image parameter can comprise modifying the focus value based on the proximity of the wearable device. By way of another example, the image parameter can correspond to lighting to be modified to ensure proper lighting for the first subject over the second subject.

The image parameter can also be modified based on the control data of the user input, at least in part. Where the receiver module 310 receives both sensor data and control data from the wearable computing device 150 or 160, the image parameter can be modified in part based on the sensor data received from the wearable computing device 150 or 160 and in part based on the control data received from the wearable computing device 150 or 160. For example, the control data can cause the modification module 330 to change a first image parameter, a focus setting, from manual focus to automatic focus. The modification module 330 can change a second related image parameter, a focus value, to focus on a subject proximate to the wearable computing device 150 or 160 based on the sensor data. By way of further example, the control data can cause the modification module 330 to change a single image parameter (e.g., white balance) to within a predetermined range and the sensor data can cause the modification module 330 to further refine the predetermined range to a smaller range or a single value.

In operation 450, the capture module 340 captures the image data (e.g., the image to be captured) using the modified image parameter. For instance, the capture module 340 can be a portion of the image capture device 213 and cause the image sensor of the image capture device 213 to capture the image data using the modified image parameter and store the captured image data on a non-transitory machine-readable storage medium associated with the image capture device 213. Where the capture module 340 is not part of the image capture device 213, the capture module 340 can communicate with the image capture device 213 via the communication module 350 to cause the image capture device 213 to capture the image data.

In some embodiments, the capture module 340 can generate a processor or user interface interrupt to cause the image capture device 213 to capture the image data. The capture module 340 can then receive the image data from the image capture device 213 and store the image data on the non-transitory machine-readable storage medium.

Figure 5:
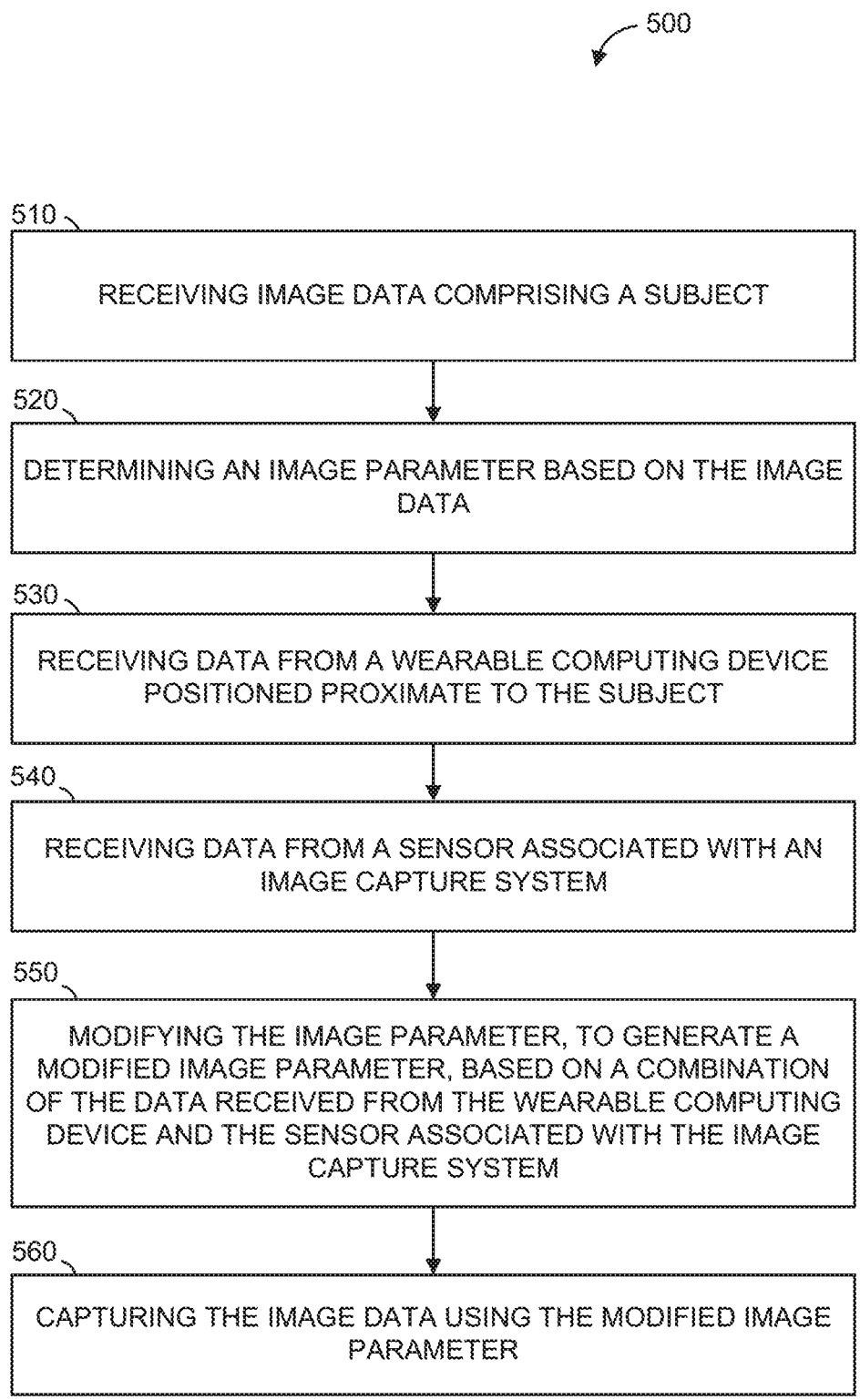
FIG. 5 is a flowchart illustrating operations of an image capture system in performing a method of determining an image parameter of an image to be captured and modifying the image parameter based on sensor data received from a wearable computing device and sensor data received from a sensor associated with the image capture system, according to some example embodiments.

FIG. 5 is a flowchart illustrating operations of the image capture system 300 in performing a method 500 of determining an image parameter of an image to be captured and modifying the image parameter based on sensor data received from the wearable computing device 150 or 160 and sensor data received from a sensor associated with the image capture system 300, the image capture device 213 or the user device 130. Operations in the method 500 may be performed by the image capture system 300, using modules described above with respect to FIG. 3. As shown in FIG. 5, the method 500 can include one or more of the operations of the method 400.

In operation 510, the receiver module 310 receives image data of an image to be captured. The image data comprises one or more subject. The operation 510 can be performed similarly to operation 410. For instance, the operation 510 can be performed by the receiver module 310 receiving the image data from the image capture device 213 via the communication module 350 prior to the image being captured and stored in non-transitory machine-readable storage media associated with the image capture device 213.

In operation 520, the determination module 320 determines an image parameter based on the image data. In some embodiments, the operation can be performed similarly to the operation 420. For example, the determination module 320 can determine the image parameter by receiving the image parameter within the image data, receiving the image parameter as part of metadata associated with the image data, or by comparing the image data with predetermined image parameter values.

In operation 530, the receiver module 310 receives data from a wearable computing device 150 or 160 positioned proximate to the subject. The operation 530 can be performed similarly to the operation 430. In some embodiments, the data from the wearable computing device 150 or 160 can comprise sensor data, control data, or combinations thereof. The data from the wearable computing device 150 or 160 can be received by the receiver module 310 via one or more signals received by the communication module 350.

In operation 540, the receiver module 310 receives data from a sensor associated with the image capture system 300. In some example embodiments, the receiver module 310 can receive sensor data from one or more sensors internal to the user device 130 or one or more sensors external to the user device 130. The receiver module 310 can receive the sensor data directly from the one or more sensor, or from the communication module 350 in communication with the one or more sensor. Where the receiver module 310 receives sensor data from a plurality of sensors associated with the user device 130, a portion of the sensor data can be received from the one or more sensor external to the user device 130 and a portion of the sensor data can be received from the one or more sensor internal to the user device 130. For instance, the one or more external sensor can be a periphery device associated with the image capture device 213, such as a light meter, a GPS device, a microphone, an external lens, or any other suitable periphery device.

In operation 550, the modification module 330 modifies the image parameter. The modification of the image parameter generates a modified image parameter based on a combination of the data received from the wearable computing device 150 or 160 and the data received from the sensor associated with the image capture system. In some example embodiments, the operation 550 can be performed similarly to the operation 440. For instance, where the one or more sensor associated with the user device 130 is a light sensor, and the sensor data from the wearable computing device 150 or 160 is sensor data from a light sensor of the wearable computing device 150 or 160, the modification module 330 can modify the image parameter (e.g., white balance, color balance, aperture size, or other parameter relating to light) to a value suitable to a combination of the sensor data from the sensor associated with the user device 130 and the sensor of the wearable computing device 150 or 160.

In operation 560, the capture module 340 captures the image data using the modified image parameter. In some embodiments, the operation 560 can be performed similarly to the operation 450, by the capture module 340 generating an interrupt causing the image capture device 213 to capture the image data. The capture module 340 can then store the captured image data in a non-transitory machine readable storage medium associated with the image capture device 213.

Figure 6:
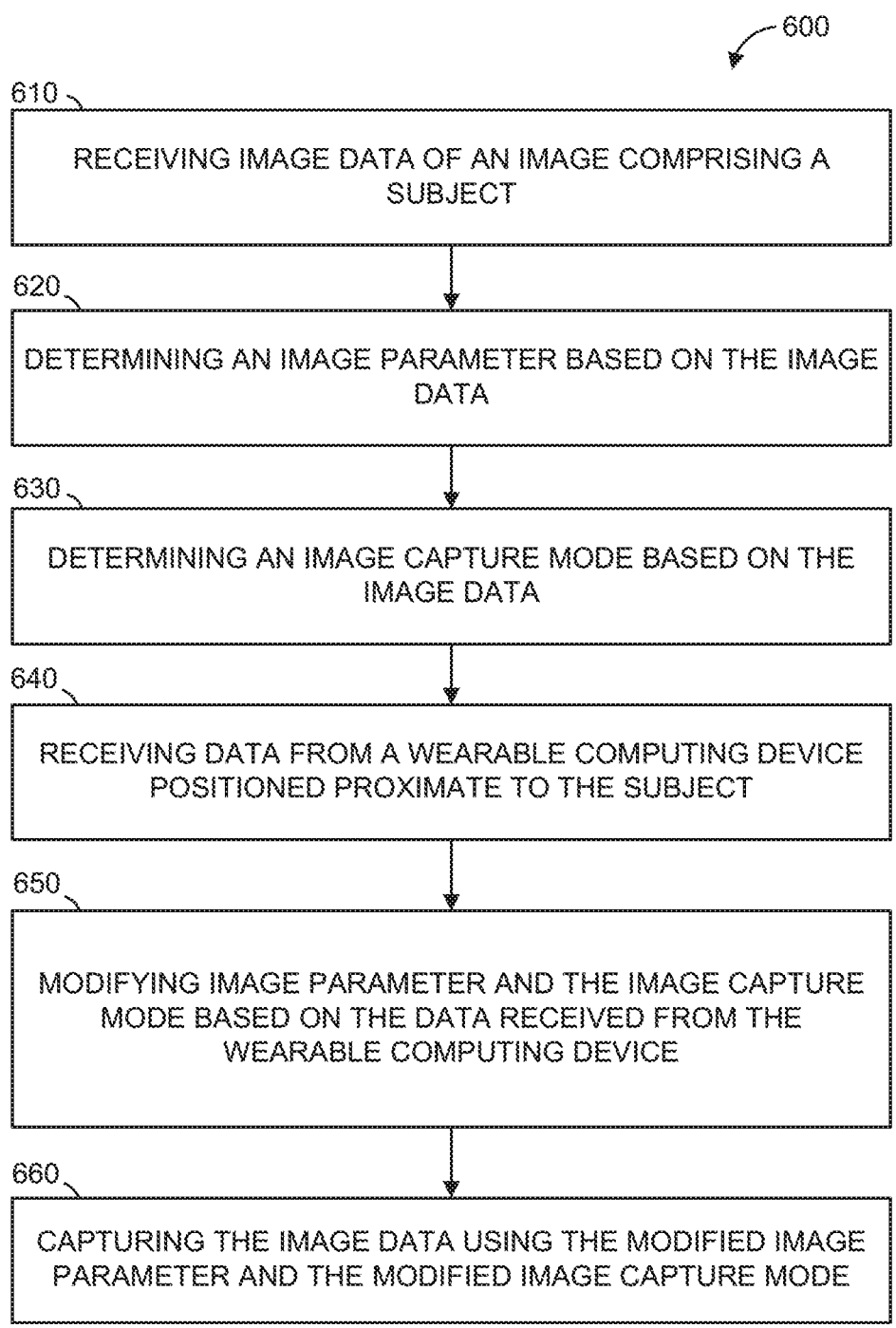
FIG. 6 is a flowchart illustrating operations of an image capture system in performing a method of determining an image parameter and a capture mode of an image to be captured and modifying the image parameter and the capture mode based on data received from a wearable computing device, according to some example embodiments.

FIG. 6 is a flowchart illustrating operations of the image capture system 300 in performing a method 600 of determining an image parameter and a capture mode of an image to be captured and modifying the image parameter and the capture mode based on data received from the wearable computing device 150 or 160. Operations in the method 600 may be performed by the image capture system 300, using modules described above with respect to FIG. 3. As described herein, the method 600 can include one or more of the operations of the method 400 or the method 500.

In operation 610, the receiver module 310 receives image data of an image to be captured. The image data comprises at least one subject. The operation 610 can be performed similarly to the operation 410 and 510 with the receiver module 310 receiving image data from the image capture device 213 directly or via the communication module 350.

In operation 620, the determination module 320 determines an image parameter based on the image data. The operation 620 can be performed similarly to the operation 420 or the operation 520. For example, the determination module 320 can determine the image parameter based on one or more of a parameter value included in the image data, a parameter value included in metadata associated with the image data, a comparison of a received image parameter and a set of predetermined image parameter values or settings. In some example embodiments, the determination module 320 can also determine the image parameter based on two or more known image parameters related to the image parameter to be determined.

In operation 630, the determination module 320 determines an image capture mode of the image capture device 213 associated with the user device 130 based on the image data. For example, the image capture mode can be determined based on the image parameter to select a first image capture mode from a predetermined set of image capture modes. The image capture mode can also be determined based on the subject in the image data. The determination module 320 can determine the image capture mode based on an evaluation of the image data, evaluation of the metadata associated with the image data, a comparison to a predetermined image capture mode, or other suitable methods.

The image capture mode can include a plurality of predetermined settings or values for camera parameters (e.g., parameters of the image capture device 213) which can be applied to captured image data by the image capture device 213 at the time of capturing the image data. For instance, the image capture mode can include a predetermined set of image parameters or values for image parameters. For example, the image capture mode can include one or more filters, an aspect ratio, a field of view, an exposure time, an ISO film speed setting, a flash setting, and a color balance. The image capture mode can cooperate with one or more additional image parameters to enable processing of captured image data for a desired effect.

In operation 640, the receiver module 310 receives data from a wearable computing device 150 or 160 positioned proximate to the subject. The operation 640 can be performed similarly to the operation 430 or the operation 530. As discussed above, the data from the wearable computing device 150 or 160 can comprise sensor data, control data, or combinations thereof. The data from the wearable computing device 150 or 160 can be received by the receiver module 310 via one or more signals received by the communication module 350.

In operation 650, the modification module 330 modifies the image capture mode. The modification of the image capture mode generates a modified image capture mode based (e.g., in response to) on the data received from the wearable computing device 150 or 160. For example, where the image capture mode is the first image capture mode selected from the predetermined set of image capture modes, the first image capture mode can be modified by selecting a second image capture mode from the predetermined set of image capture modes based on the data received from the wearable computing device 150 or 160.

In some example embodiments, the image capture mode can include a plurality of image capture settings (e.g., predetermined modifications to one or more image parameter). In these embodiments, the modification module 330 can modify the image capture mode by determining one or more image capture settings to be modified from the plurality of image capture settings. The determination of the one or more image capture settings to be modified can be based upon a difference between the data received from the wearable computing device 150 or 160 and data received from the image capture device 213. Based on the determination, the modification module 330 can change a value associated with the one or more image capture settings to be modified. For example, the image capture device 213 can indicate a white balance value contraindicated for proper exposure of the image data by data received from the wearable computing device 150 or 160. The white balance value can be changed based on the contraindication.

The modification module 330 can also modify the image capture mode and the image parameter, generating a modified image parameter, in response to the data received from the wearable computing device 150 or 160. For example, the modification module 330 can modify the image capture mode, as described above, and modify the image parameter, which is related to the image capture mode but not affected by the modification to the image capture mode.

In operation 660, the capture module 340 captures the image data using the modified image parameter and the modified image capture mode. The operation 660 can be performed similarly to the operation 450 or the operation 560, with the inclusion of processing the captured image data using the modified image capture mode or capturing the image data using settings associated with the modified image capture mode.

According to various example embodiments, one or more of the methodologies described herein may facilitate capture of image data with image parameters based on data received from a wearable computing device or a combination of data from a device capturing the image data and data from the wearable computing device. Moreover, one or more of the methodologies described herein may facilitate capture of image data with image parameters and image capture modes based on data received from a wearable computing device or a combination of data received from the wearable computing device and data from the device capturing the image data. Hence, one or more of the methodologies described herein may facilitate capturing images with generally desirable image parameters and capture parameters to enable automated or semi-automated parameter adjustments appropriate for ambient conditions surrounding the subjects to be photographed.

When these effects are considered in aggregate, one or more of the methodologies described herein may obviate a need for certain efforts or resources that otherwise would be involved in setting image parameters or image capture modes for capturing an image with desired image aspects (e.g., focus, color balance, aspect ratio, filters). Efforts expended by a user in determining image parameters or capture modes appropriate for ambient conditions in an environment surrounding a subject of an image to be captured may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 7:
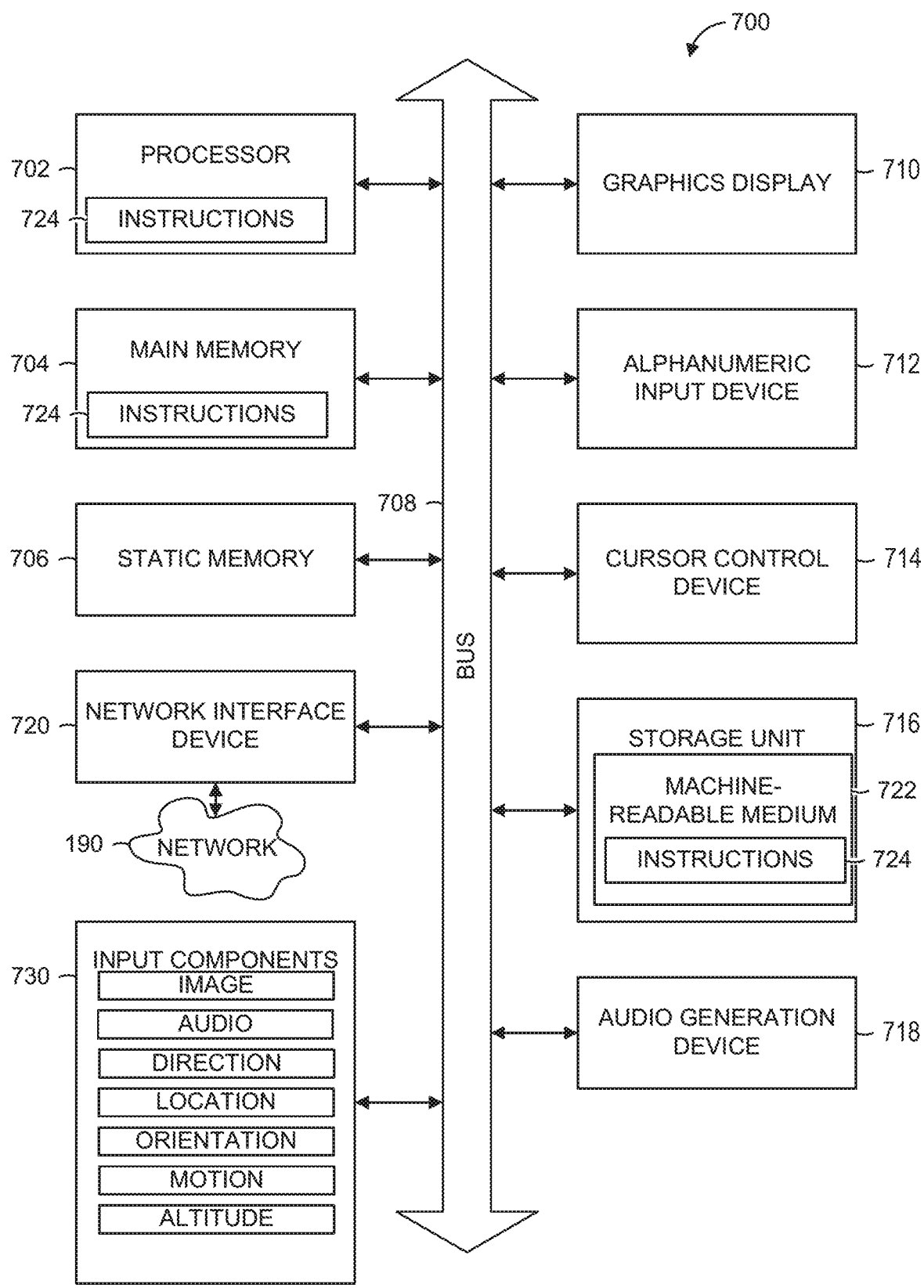
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read processor executable instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be communicatively coupled (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to act as one or more modules described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, an audio generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., hypertext transfer protocol (HTTP)).

In some example embodiments, the machine 700 may be a portable computing device, such as a smart phone or tablet computer, and have one or more additional input components 730 (e.g., sensors or gauges). Examples of such input components 730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), and an altitude detection component (e.g., an altimeter). Inputs harvested by any one or more of these input components 730 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may be a module temporarily configured by software (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:
1. A method comprising:
receiving, by an image capture device and from a wearable device, sensor data associated with a first subject to be captured in an image by the image capture device, the wearable device being separate and external to the image capture device, the sensor data comprising audio data;
modifying, by the image capture device based on the received sensor data, an image parameter to a modified image parameter that focuses image capture on the first subject when compared to at least a second subject; and
capturing, by the image capture device based on the modified image parameter, image data including the first subject and the second subject, the image data including an increased focus on the first subject when compared to the second subject.

2. The method of claim 1, wherein the wearable device is positioned proximate to the first subject.

3. The method of claim 1, wherein the modifying the image parameter further comprises modifying a focus value to focus on the first subject by changing a default focus value based on the received sensor data indicating a proximity of the wearable device to at least one of the image capture device or the first subject.

4. The method of claim 1, wherein the modifying the image parameter further comprises modifying a focus value to focus on the first subject by changing, based on the received sensor data indicating a proximity of the wearable device to at least one of the image capture device or the first subject, a default focus value covering the first subject and the second subject.

5. The method of claim 4, wherein the modifying the image parameter further comprises modifying a light value to focus more lighting on the first subject when compared to the second subject.

6. The method of claim 1, wherein the received sensor data further comprises position data.

7. The method of claim 6, wherein the received sensor data further comprises at least one of time data, light data, or acceleration data.

8. The method of claim 1, wherein the modifying the image parameter further comprises generating, based on the received sensor data, the modified image parameter, wherein the wearable device is one of a plurality of wearable devices and is positioned proximate to the first subject.

9. The method of claim 8, wherein the receiving the sensor data further comprises receiving a plurality of sensor data from the plurality of wearable devices, wherein the modifying the image parameter is based at least in part on the plurality of sensor data.

10. The method of claim 3, wherein the focus value represents a value associated with a point at which one or more light rays converge.

11. A system, comprising:
one or more processors; and
a non-transitory machine-readable storage medium coupled to the one or more processors, the non-transitory machine-readable storage medium including instructions that, when executed by the one or more processors, cause the one or more processors to perform operations comprising:
receiving, by an image capture device and from a wearable device, sensor data associated with a first subject to be captured in an image by the image capture device, the wearable device being separate and external to the image capture device, the sensor data comprising audio data;
modifying, by the image capture device based on the received sensor data, an image parameter to a modified image parameter that focuses image capture on the first subject when compared to at least a second subject; and
capturing, by the image capture device based on the modified image parameter, image data including the first subject and the second subject, the image data including an increased focus on the first subject when compared to the second subject.

12. The system of claim 11, wherein the wearable device is positioned proximate to the first subject.

13. The system of claim 11, wherein the modifying the image parameter further comprises modifying a focus value to focus on the first subject by changing a default focus value based on the received sensor data indicating a proximity of the wearable device to at least one of the image capture device or the first subject.

14. The system of claim 11, wherein the modifying the image parameter further comprises modifying a focus value to focus on the first subject by changing, based on the received sensor data indicating a proximity of the wearable device to at least one of the image capture device or the first subject, a default focus value covering the first subject and the second subject.

15. The system of claim 14, wherein the modifying the image parameter further comprises modifying a light value to focus more lighting on the first subject when compared to the second subject.

16. The system of claim 11, wherein the received sensor data further comprises position data.

17. The system of claim 16, wherein the received sensor data further comprises at least one of time data, light data, or acceleration data.

18. The system of claim 11, wherein the modifying the image parameter further comprises generating, based on the received sensor data, the modified image parameter, wherein the wearable device is one of a plurality of wearable devices and is positioned proximate to the first subject.

19. The system of claim 18, wherein the receiving the sensor data further comprises receiving a plurality of sensor data from the plurality of wearable devices, wherein the modifying the image parameter is based at least in part on the plurality of sensor data.

20. The system of claim 13, wherein the focus value represents a value associated with a point at which one or more light rays converge.

21. A non-transitory machine-readable storage medium comprising processor-executable instructions that, when executed by a processor of a machine, cause the machine to perform operations comprising:
receiving, by an image capture device and from a wearable device, sensor data associated with a first subject to be captured in an image by the image capture device, the wearable device being separate and external to the image capture device, the sensor data comprising audio data;
modifying, by the image capture device based on the received sensor data, an image parameter to a modified image parameter that focuses image capture on the first subject when compared to at least a second subject; and
capturing, by the image capture device based on the modified image parameter, image data including the first subject and the second subject, the image data including an increased focus on the first subject when compared to the second subject.

* * * * *